US007148652B2

(12) United States Patent
Ghanemi et al.

(10) Patent No.: US 7,148,652 B2
(45) Date of Patent: Dec. 12, 2006

(54) METHOD AND APPARATUS FOR DETERMINING AND HANDLING BRAKE FAILURES IN OPEN LOOP VARIABLE FREQUENCY DRIVE MOTORS

(75) Inventors: Ace Ghanemi, Weatherford, TX (US); Michael L. Perkins, Aledo, TX (US); Michael J. Roessler, Azle, TX (US); Kevin McKeown, Fort Worth, TX (US)

(73) Assignee: Ace-Tronics Company, Inc., Fort Worth, TX (US)

( * ) Notice: Subject to any disclaimer, the term of this patent is extended or adjusted under 35 U.S.C. 154(b) by 0 days.

(21) Appl. No.: 10/835,775

(22) Filed: Apr. 30, 2004

(65) Prior Publication Data

US 2005/0241884 A1 Nov. 3, 2005

(51) Int. Cl.
*H02P 21/00* (2006.01)

(52) U.S. Cl. ...................... 318/805; 318/807; 318/808; 318/810; 318/812; 318/563

(58) Field of Classification Search ................ 388/911, 388/833, 854; 187/281, 286, 305; 188/1.11 E, 188/162, 242, 30, 61; 318/362, 363, 364, 318/365, 366, 805, 807, 808, 810, 812, 273–275, 318/371, 370, 563; 254/266
See application file for complete search history.

(56) References Cited

U.S. PATENT DOCUMENTS 3,248,625 A * 4/1966 Wycoff ........................ 318/742
4,207,508 A * 6/1980 Habisohn ..................... 318/742
4,761,600 A * 8/1988 D'Atre et al. .............. 318/759
4,891,764 A * 1/1990 McIntosh ..................... 700/183
5,077,508 A * 12/1991 Wycoff et al. .............. 318/436
5,179,336 A * 1/1993 Orgovan ...................... 318/758
5,225,712 A * 7/1993 Erdman ........................ 290/44
5,294,066 A * 3/1994 Lacour ..................... 242/390.9
5,296,791 A * 3/1994 Hipp .......................... 318/563
5,319,292 A * 6/1994 Backstrand ................. 318/371
5,343,134 A * 8/1994 Wendt et al. ............... 318/757
5,548,198 A * 8/1996 Backstrand ................. 318/799
5,682,023 A * 10/1997 McHugh et al. ............ 187/316
5,751,076 A * 5/1998 Zhou ........................... 310/12
5,875,281 A * 2/1999 Thexton et al. ............. 388/801
6,078,156 A 6/2000 Spurr
6,097,165 A * 8/2000 Herron ........................ 318/372
6,430,463 B1 * 8/2002 Lysaght ...................... 700/168
6,614,198 B1 * 9/2003 Vaisanen .................... 318/434
6,710,574 B1 * 3/2004 Davis et al. ................ 318/800
6,720,751 B1 * 4/2004 Plasz et al. ................. 318/567
6,732,838 B1 * 5/2004 Okada et al. ............... 187/290
6,822,408 B1 * 11/2004 Eckardt et al. ............. 318/265
2002/0039010 A1 * 4/2002 Plasz et al. ................. 318/567

(Continued)

OTHER PUBLICATIONS

Safetronics, AD10 System Automation Drive Specifications, Apr. 2001, found at www.safetronics.com.

*Primary Examiner*—Karen Masih
(74) *Attorney, Agent, or Firm*—Bracewell & Giuliani LLP

(57) ABSTRACT

A controller for a variable frequency drive monitors electrical power from a variable frequency drive motor while a brake is maintaining a load driven or moved by the motor without requiring additional feedback components of a closed loop configuration. If excess electrical power is being generated by the motor, an undesirable condition in the brake is indicated. Support or maintenance of the load is assumed by the motor in that event. Appropriate alarms or indicators are also activated.

9 Claims, 4 Drawing Sheets

U.S. PATENT DOCUMENTS

2002/0190695 A1* 12/2002 Wall et al. .................... 322/17
2003/0026116 A1* 2/2003 Ueki et al. .................... 363/60
2003/0057916 A1* 3/2003 Davis et al. ................ 318/800
2003/0223738 A1* 12/2003 Hughes et al. .............. 388/800

* cited by examiner

METHOD AND APPARATUS FOR DETERMINING AND HANDLING BRAKE FAILURES IN OPEN LOOP VARIABLE FREQUENCY DRIVE MOTORS

BACKGROUND OF INVENTION

1. Field of the Invention

The present invention relates generally to variable frequency driven motors and in particular to brake systems operating with variable frequency driven motors. Still more particularly, the present invention relates to a method and apparatus for responding to brake failure in open loop variable frequency driven motors.

2. Description of the Related Art

Variable frequency driven motors are utilized for a variety of lifting mechanisms, from overhead cranes and hoists to elevators. Typically, when a load supported by a variable frequency driven motor is to be held in suspension for a significant period of time, an external brake is set and the motor is disengaged from supporting the load. This allows savings in the power required for supporting the load using the motor and also saves the motor from unnecessary wear. When a brake, however, is employed to hold a load in suspension, various events may result in the inadvertent release of the load. The brake can be out of adjustment; the brake pads can be worn to the extent of reduced torque capability, or some other mechanical failure. In any case, the effect of dropping a load may be disastrous.

U.S. Pat. No. 6,097,165, by Herron, titled "Method and Apparatus for Handling Brake Failure in Variable Frequency Drive Motors," which is commonly owned with the subject matter of the present application, provides techniques for handling brake failure in closed loop variable frequency drive motors. When the motor is stopped and the external brake set, pulse generator feedback is furnished from the motor and is monitored in a closed loop variable frequency drive. When the monitored feedback exceeds an alarm level, a brake problem is indicated. The motor is activated to maintain the load supported by the brake and an alarm energized.

So far as is known, until the present invention, brake failures have been determined with the aid of a closed loop system, with a pulse generator mounted on the motor used in conjunction with a closed loop variable frequency drive. Systems of this type, while desirable, can require the use of either shielded or fiberoptic cable to provide the feedback signals. In addition, encoder and additional control boards can be required. These items can increase the costs of such systems and also raised additional maintenance and testing considerations.

Recognized is that it would be desirable, therefore, to provide an apparatus and related methods for preventing a load elevated by a variable frequency driven motor and supported by a brake that could prevent dropping the load in the event of brake failure and that does not require a closed loop system. It would further be desirable if the apparatus could be incorporated into existing commercial embodiments of open loop variable frequency driven motor systems or apparatus without the introduction of numerous additional components.

SUMMARY OF INVENTION

In view of the foregoing, embodiments of the present invention advantageously provide a method and apparatus for determining and handling failures in brakes maintaining a load driven by a variable frequency drive motor. For example, in various embodiments of the present invention, a variable frequency drive is provided with the capability of monitoring an increase in voltage or power caused by the motor being in a generating state. If an increase in voltage or power is determined to be from the output of the open loop variable frequency drive (i.e. due to the motor overhauling), the drive can place the motor in a brake fail sequence. Once the brake is determined to be in a failed condition, an output alarm condition can be annunciated and the load can be automatically lowered at a safe rate of speed. Advantageously, the present invention can provide these results in an open loop configuration, without requiring a closed loop feedback mechanism.

Specifically, embodiments of the present invention provide an apparatus for responding to malfunctions of a brake when the brake is maintaining a load. The apparatus can include a variable frequency drive preferably in the form of an open loop variable frequency drive for driving a variable frequency drive motor which is adapted to move the load. The apparatus also includes a brake for stopping lifting or lowering of the load controlled by the variable frequency drive via a brake control switch. The variable frequency drive includes a controller adapted to monitor electrical power, such as voltage, generated by the motor when the brake is set on, excessive voltage being indicative of brake failure, to thereby determine if a brake failure exists. The variable frequency drive can include a DC bus having a voltage level and which receives power generated by the motor. The controller can monitor the voltage levels of the DC bus to thereby detect power generated by the motor to determine if the brake failure exists. The controller can be further adapted to respond to detection of excess power being generated by the motor, supporting the load with the motor. The variable frequency drive, responsive to determination of the brake failure is adapted to apply power to the motor until indications of brake failure no longer exist.

Embodiments of the present invention provide a method of handling brake failure for a variable frequency driven motor maintaining a load. The controller for the variable frequency drive monitors electrical power from the motor, preferably voltage levels of the power generated by the motor, to thereby determine if a brake failure exists. This is accomplished without the need for additional feedback components of a closed loop configuration. The controller can determine whether excess power is being generated by the motor when the brake is set on. Responsive to such determination, the controller can maintain the provision of a selected amount of torque from the motor to support the load with the motor, typically by lowering the load at a safe speed. If it is determined that excess voltage is not being generated by the motor, the controller can reduce the reverse torque to substantially zero to allow support of the load with the brake.

Embodiments of the present invention can also include a computer program product in a computer usable medium. The computer program product can include instructions for monitoring electrical power from an open loop variable frequency drive motor maintaining a load while the motor is stopped, and instructions to determine whether excess power is being generated by the motor, which is indicative of brake failure. The computer program product can also include instructions responsive to the determination that excess power is being generated by the motor to support the load with the motor. In a preferred implementation, the instructions can be stored in a memory of the controller of the variable frequency drive.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
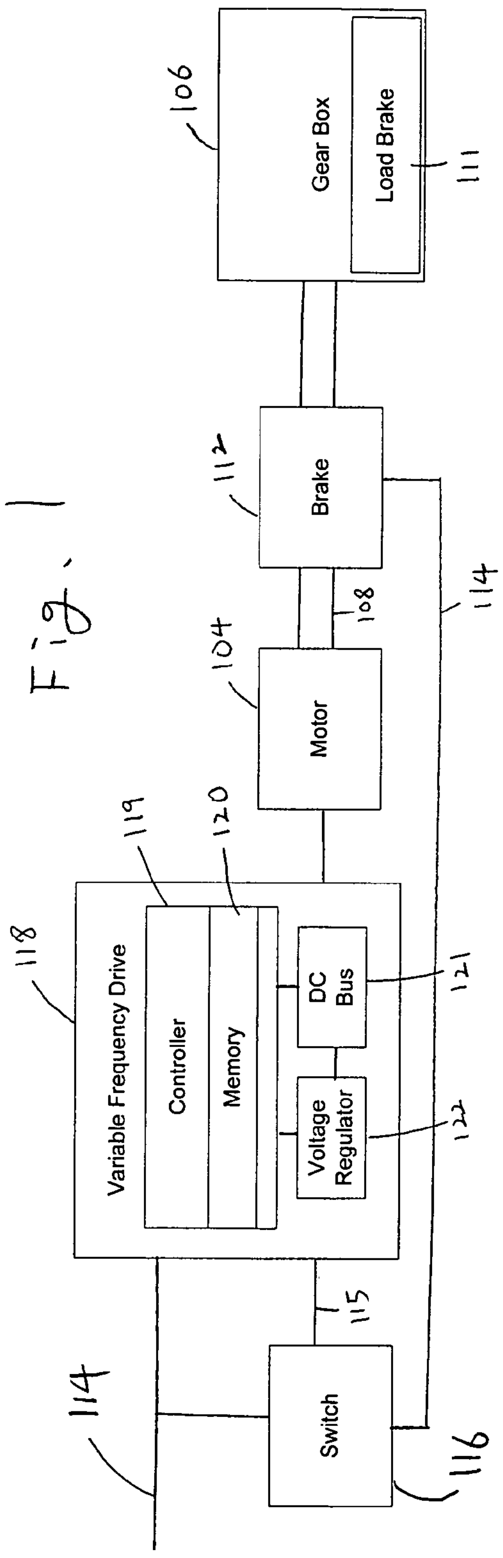
FIGS. 1–3 are schematic diagrams of an apparatus for handling brake failure for a variable frequency driven motor illustrating various positions of a brake with respect to a motor and a transmission, according to embodiments of the present invention.
Figure 2:
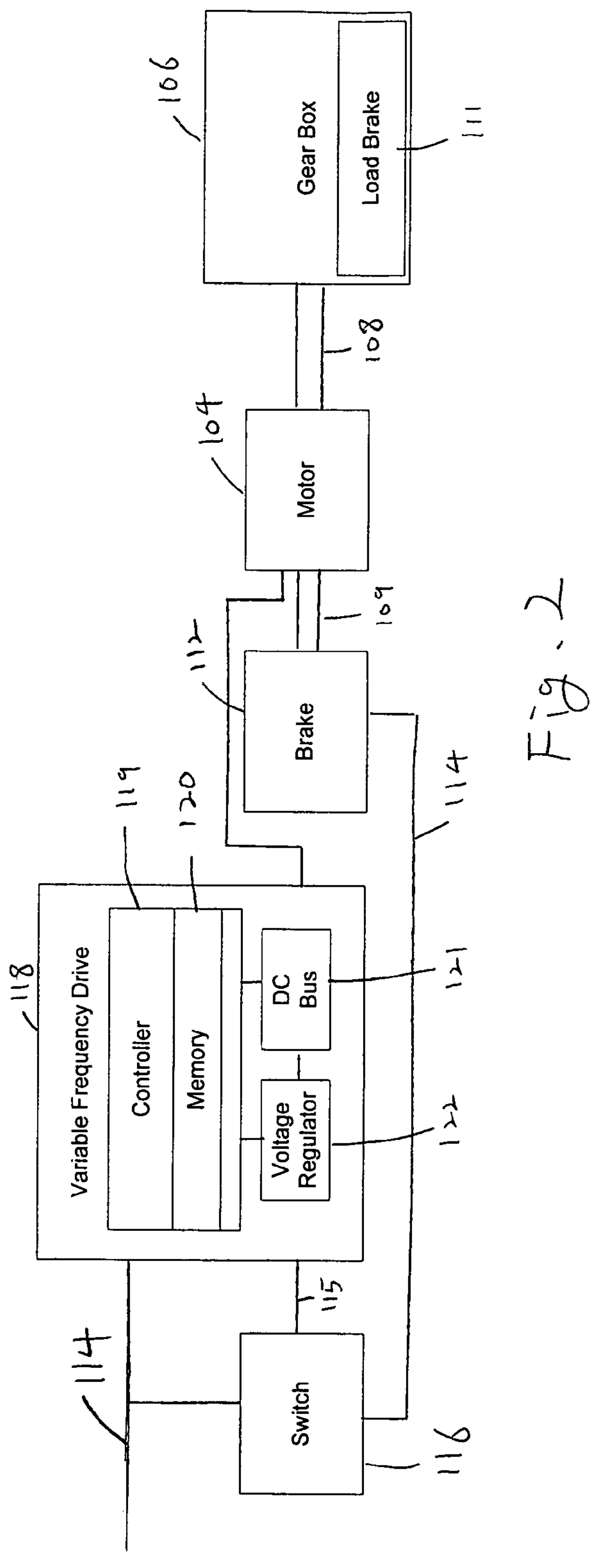
Figure 3:
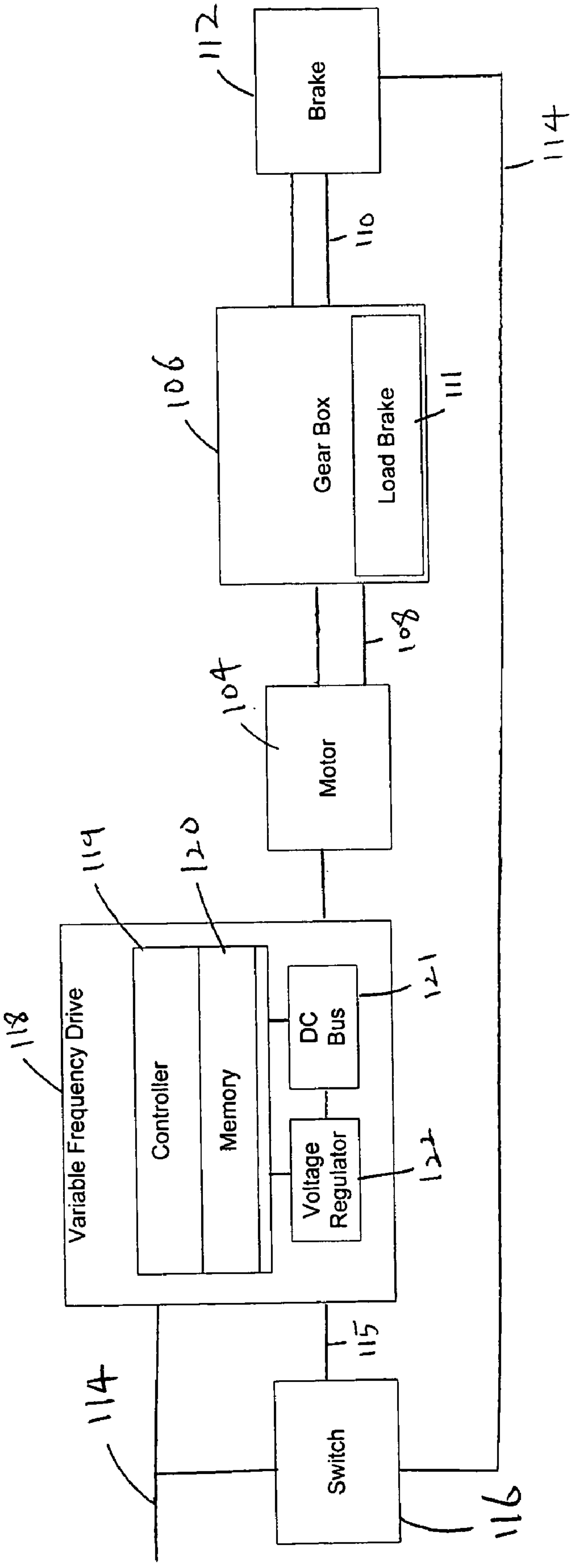

With reference now to the figures, and in particular with reference to FIGS. 1–3, depicted is an apparatus for handling brake failure for a preferably open loop variable frequency driven motor 104 in accordance with embodiments of the present invention. The apparatus includes a motor 104 connected to a gearbox 106 via a common shaft 108. Shaft 108 can be a multi-segment or unitary shaft (FIG. 1). Shaft 108 can include a shaft segment 109 (FIG. 2) connected to or through motor 104 or a shaft segment 110 (FIG. 3) connected to or through gearbox 106. Shaft segments 109, 110, can be unitary with shaft 108 or the connected by means known to those skilled in the art. Gearbox 106 may optionally include a load brake 111 designed to retard loads from falling when approximately zero torque is applied by motor 104. Selectively operable on shaft 108 is an electromechanical brake 112, which may support loads when motor 104 is stopped and/or applying at or near zero torque. Brake 112 can be electrically connected to input 114 from a conventional external electrical power source (not shown) via switch 116, which actuates brake 112. Switch 116 is controlled by VFD 118 through line 115. In the preferred configuration, the brake 112 is configured such that electrical power can be supplied to the brake 112 via switch 116 in order to release the brake 112. Brake 112, correspondingly, can be connected directly to shaft 108 (FIG. 1) or to either shaft extension 109, 110 (FIGS. 2 and 3), of shaft 108.

Motor 104 preferably receives power from an open loop variable frequency drive 118, which is also connected by input 114 to the external electrical power source. Variable frequency drive 118 has, in the past, been preferred to be that of a flux vector drive (i.e. one that has encoder feedback). However, with this invention, the variable frequency drive 118 can be an open loop vector drive employing a mathematical model for controlling the operation of motor 104. Such drives are known in the art. Open loop enable frequency drives, such as a Model G7 available from Toshiba, for example, may be employed.

The open loop variable frequency drive 118 includes a controller 119, which is selectively programmable to control operation of the variable frequency drive 118 and the switch 116, and includes a memory 120 for storing various programming instructions, which can be entered using various forms of machine readable medium (not shown). The variable frequency drive 118 also can include a DC bus 121. A preferably internal voltage regulator 122 can be electrically connected to the DC bus 121 to regulate voltage on the DC bus 121. In the preferred configuration, the internal voltage regulator 122 includes an internal breaking transistor (not shown) and resistor (not shown) to dissipate any excess voltage or power generated by the motor 104. The controller 119 can monitor the voltage on the DC bus 121. In the preferred configuration, the controller 119 can control voltage suppression of the DC bus 121 through control of the voltage regulator 122. An alarm or other similar device (not shown), electrically connected to the controller 119, can be further provided to annunciate the existence of a failure of brake 112. Advantageously, through the instructions stored in memory 120, the open loop vector variable frequency drive 118 can be programmed to operate as described below for handling of a brake failure.

Figure 4:
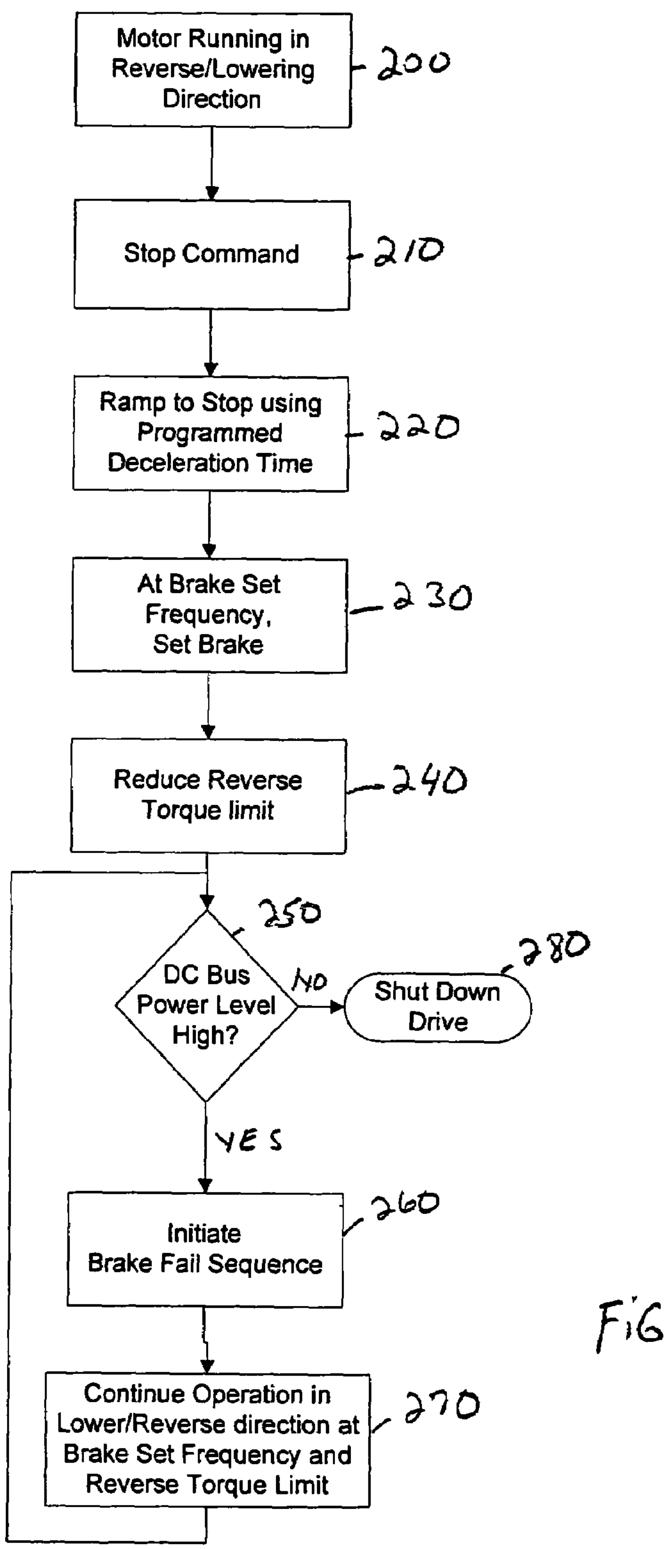
FIG. 4 is a high-level flowchart for a process of handling brake failure for a variable frequency driven motor, according to an embodiment of the present invention.
Figure 5:
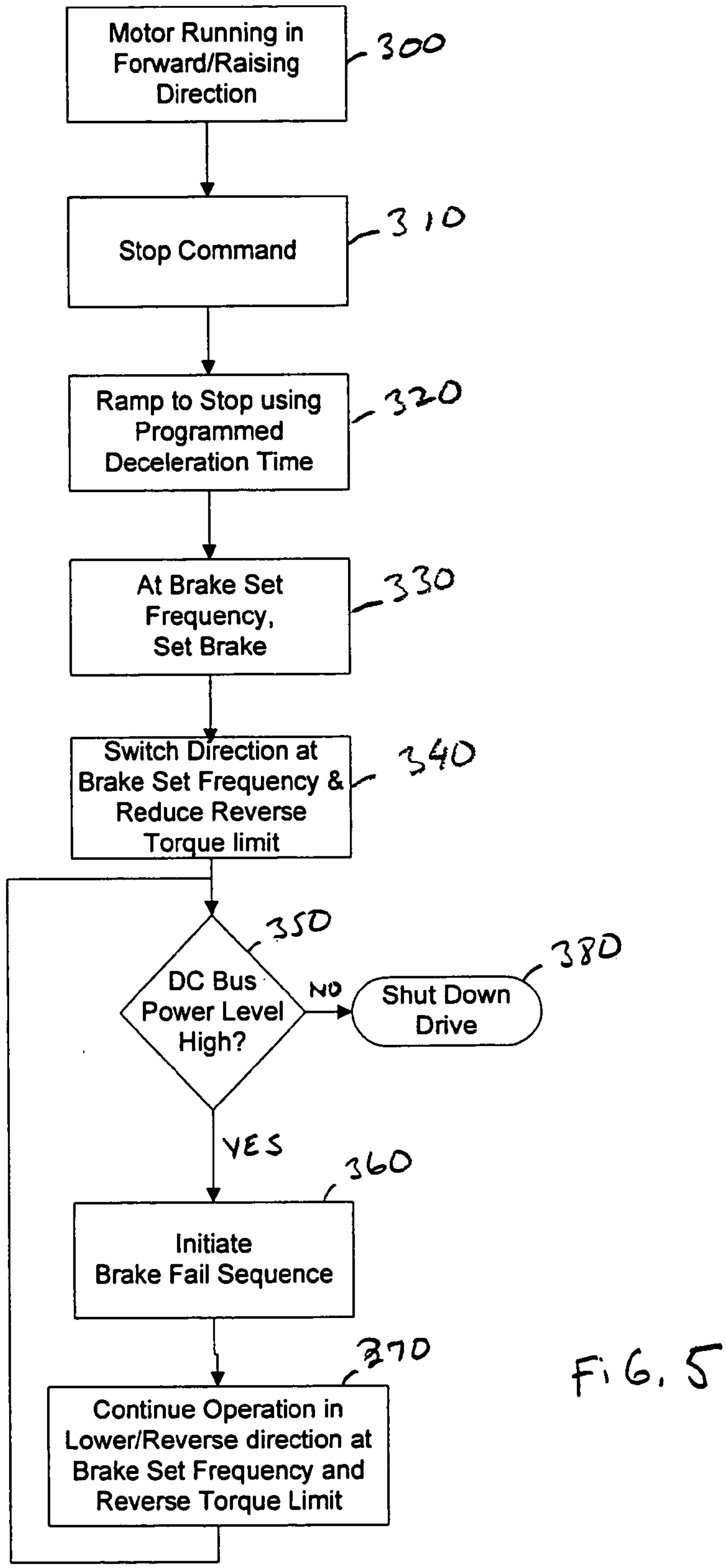
FIG. 5 is a high-level flowchart for a process of handling brake failure for the variable frequency driven motor according to an embodiment of the present invention.

Referring to FIGS. 4 and 5, illustrated is a high level flowchart for a process of handling a brake failure in a open loop vector variable frequency driven motor 104 in accordance with a preferred embodiment of the present invention. There are generally two different scenarios possible in the brake check sequence, these being: a forward/raising sequence and a reverse/lowering operation.

Referring to FIG. 4, shown is the flowchart for determining and handling brake failure during the reverse/lowering operation. The process begins at step 200, which depicts the motor running in the reverse/lowering direction at some desired speed. The process then continues to step 210, which indicates the drive 118 has received a stop command from the operator. When the stop is initiated, the drive 118, under control of instructions stored in memory 120, proceeds to line 220 and gradually decreases or ramps from the previous speed (frequency) down to a brake set frequency, typically approximately 2 Hz. Upon reaching the brake set frequency, the drive 118, through control line 115, commands the brake 112 to set by removing power from the brake 112 (line 230) and reduces the internal reverse torque limit to some suitable lower limit, such as 10% of rated torque, for example, as outlined in line 240. Operation at the suitable torque then continues at the brake set frequency for a brake set time, the reverse torque being applied with the brake 112 set on. Note, torque, brake set frequency, and brake set time preferably can be preselected and stored in memory 120 for access by controller 119. Note also, though having the brake 112 set by removing power provides a fail safe control, the brake 112 can alternatively be implemented such that it is set by application of power rather than removal of power.

The next step in the operating sequence of FIG. 4, line 250, is to determine if the brake 112 is functioning correctly. To do this, the variable frequency drive 118 monitors the DC bus level to detect if the motor 104 is in a generating state, to thereby determine if a brake failure exists. In the preferred configuration, if the controller 119 of the variable frequency drive 118 detects a noticeable voltage increase, indicative of brake failure, the drive 118 can proceed to line 260 on the flow chart, which is the brake fail sequence. The controller 119 of the variable frequency drive 118 can monitor the DC bus 121 and compare the voltage level of the DC bus 121 to a preselected or predetermined brake failure voltage level, an overvoltage or increased level of which is indicative of brake failure. Thus, the DC bus 121 can provide the controller 119 indications of overhauling (generating) by the motor 104. Note, the above described reference voltage level need not be a fixed value but maybe relative to that expected according to relative environmental conditions.

Responsive to the detection of the increased voltage in the DC bus 121, the controller 119 can further control and monitor the status of the voltage regulator 122. Further, in the preferred configuration, the controller 119 can control an internal braking transistor or voltage dissipater circuit (not shown) of the voltage regulator 122. Advantageously, control of the voltage regulator 122, by the controller 119, provides intelligent power regulation. More specifically, as a result of such provisions for monitoring the voltage on the DC bus 121 and control of the voltage regulator 122, even though the voltage applied to the DC bus 121 may not appear to an outside observer to be excessive due to voltage suppression by the voltage regulator 122, such implementation advantageously allows the controller 119 to determine and signal the existence of a brake failure, brake failure being indicated by application of an increasing voltage or excessive voltage applied to the DC bus 121 by the motor 104 as a result of the motor 104 being in a generating or overhauling state.

The brake fail sequence (line 260) starts an infinite loop until the regeneration condition is removed. Operation of the motor 104 is continued (line 270) in the lower/reverse direction at the preselected suitable lower limit, such as 10% of rated torque, at preferably the brake set frequency, so that the load can be automatically lowered at a safe rate of speed. Ultimately, this may continue until the load is placed on the ground. If, however, the drive 118 detects no noticeable voltage increase for the brake set time, the drive 118 then shuts down (line 280) and waits for the next command.

Referring to FIG. 5, shown is the flowchart for determining and handling brake failure during the forward/raising direction scenario, which begins on line 300. The process continues to step 310, which indicates the drive 118 has received a stop command from the operator. When the stop is initiated, the drive 118 proceeds to line 320 and gradually decreases or ramps from the previous speed (frequency) down to the selected brake set frequency. Upon reaching the brake set frequency, the drive 118, through control line 115 and switch 116, commands the brake 112 to set (line 330). Operations then will continue at a suitable torque at the brake set frequency for a brake set time, the forward torque being applied with the brake 112 set on. Note, torque, brake set frequency, and brake set time preferably can be preselected and stored in memory 120 for access by processor 119. Note also, these programmable parameters need not be the same as those used for the reverse/lowering direction scenario.

As shown in line 340, once the brake set time has timed out, the drive 118 changes the drive direction to the reverse/lower direction and can simultaneously change the reverse torque limit to some suitable lower limit, such as 10% of rated torque. From this step, the drive 118 then follows the same steps (beginning at line 240) as shown in the reverse/lowering flow chart (FIG. 4). If it is determined (line 350) the brake 112 is not functioning correctly, the brake fail sequence (line 360) is entered. The brake fail sequence (line 360) starts an infinite loop until the regeneration condition is removed. Operation of the motor 104 is continued (line 370) in the lower/reverse direction at the preselected suitable lower limit, such as 10% of rated torque, at preferably the brake set frequency, and the load can be automatically lowered at a safe rate of speed. If, however, the drive 118 detects no noticeable voltage increase for the brake set time, the drive 118 then shuts down (line 380) and waits for the next command.

Regardless of which scenario is implemented, once the brake 112 is determined to have failed or is failing, the variable speed drive 118 can annunciate or activate an output to be interfaced with a horn of some suitable type, or other suitable alarm indicator or indicators (not shown), to indicate a brake failure. Additionally, the forward/hoisting speed can also be limited for additional annunciation to the operator.

The invention has significant advantages. Embodiments of the present invention provide an apparatus and method for handling brake failure or inadvertent release of a load carried by variable frequency drive motors. It can be seen that embodiments of the present invention provide an open loop variable frequency drive with the capability of detecting movement of a suspended load. The variable frequency drive can monitor for, or determine the existence of, an increase in voltage due to the motor in the generating state, indicating brake failure or release. If such an increase in voltage is determined to be from the variable frequency drive motor (i.e. due to the motor overhauling) the motor is placed in a brake fail sequence. The motor can provide sufficient torque to allow a controlled descent of the load. Additionally, an alarm can be sounded to allow an operator to safely lower the load. Until now, brake failures were only determined with the aid of a closed loop system, a pulse generator mounted on the motor and used in conjunction with a closed loop variable frequency drive.

In the drawings and specification, there have been disclosed a typical preferred embodiment of the invention, and although specific terms are employed, the terms are used in a descriptive sense only and not for purposes of limitation. The description of the preferred embodiment of the present invention has been presented for purposes of illustration and description, but is not intended to be exhaustive or limit the invention in the form disclosed. The illustrated embodiments were chosen and described in order to best explain the principles of the invention and the practical application to enable others of ordinary skill in the art to understand the invention. It will be apparent, however, that various modifications and changes can be made within the spirit and scope of the invention as described in the foregoing specification. Various changes in the size, shape, materials, components, circuit elements, wiring connections and contacts, as well as in the details of the illustrated circuitry and construction and method of operation may be made without departing from the spirit of the invention. For example, most controllers provide a motor overload fault condition, in which a brake is applied and the motor stopped when motor overcurrent is detected. It may be desirable to disable this control when a brake failure is detected and being handled in accordance with embodiment of the present invention. That is, it may be preferable to allow the motor to burn itself out supporting the load rather than permit the load to be dropped due to brake failure. Also for example, though the illustrated example described lowering the load once the brake was determined to have failed, alternative operation can instead include activating an alternative breaking means responsive to detection of brake failure, rather than lowering the load.

Also, it is important to note that while the present invention has been described in the context of a fully functional variable frequency driven motor, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The invention claimed is:

1. A method of handling brake failure for a variable frequency driven motor maintaining a load, the method comprising the steps of:

(a) monitoring electrical power from the motor including monitoring voltage levels of the power generated by the motor to thereby determine if a brake failure exists;

(b) determining whether excess voltage is being generated by the motor when the brake is set on, (c) responsive to determining that excess voltage is being generated by the motor, supporting the load with the motor by lowering the load at a safe speed;

repeating steps (a)–(c) until determining excess voltage is not being generated by the motor; and responsive to determining that excess voltage is not being generated by the motor, reducing reverse torque to substantially zero and supporting the load with the brake.

2. The method of claim 1, wherein step (a) includes the step of:

monitoring voltage levels of a DC bus of a variable frequency drive driving the variable frequency driven motor to thereby determine if a brake failure exists.

3. The method of claim 1, further including the steps of:

stopping lifting or lowering of the load by the motor; and setting the brake prior to the step of monitoring electrical power from the motor.

4. The method of claim 1, further including the step of:

applying a reverse torque to a member supporting the load; and monitoring voltage levels of a DC bus of a variable frequency drive driving the variable frequency driven motor to thereby determine if a brake failure exists when applying the reverse torque.

5. The method of claim 1, wherein the variable frequency driven motor is driven by an open loop variable frequency drive, and wherein step (a) is performed at a preselected time interval at a preselected variable speed drive frequency.

6. A method of handling brake failure for an open loop variable frequency driven motor maintaining a load, the method comprising the steps of:

(a) monitoring voltage levels of a DC bus of a variable frequency drive driving the variable frequency driven motor when the brake is set on;

(b) detecting whether excess voltage is being generated by the motor by comparing the voltage levels of the DC bus to a selected brake failure voltage level indicative of brake failure to determine if a brake failure exists when the brake is set on, without requiring additional feedback components of a closed loop configuration; and (c) responsive to determining that the voltage levels exceeds the predetermined brake failure voltage level, supporting the load by maintaining application of power to the brake, and simultaneously lowering the load at a safe speed when excess voltage is being generated by applying a reverse torque to a member supporting the load and controlling a voltage regulator to dissipate excess voltage applied by the motor to the DC bus of the variable frequency drive.

7. An apparatus for responding to malfunctions of a brake when the brake is maintaining a load, the apparatus comprising:

a variable frequency drive motor adapted to move the load; and an open loop variable frequency drive adapted to be electrically connected to the motor to drive the motor and including a controller adapted to monitor voltage levels of the power generated by the motor when the brake is set on, excessive voltage being indicative of brake failure, to thereby determine if a brake failure exists, and adapted to respond to the determination of a brake failure, supporting the load with the motor by lowering the load at a safe speed.

8. The apparatus of claim 7, wherein the variable frequency drive, responsive to determination of the brake failure, is adapted to apply power to the motor until indications of brake failure no longer exist.

9. The apparatus of claim 7, wherein the variable frequency drive includes a DC bus and a voltage regulator electrically connected to the DC bus, and wherein the controller controls voltage levels of the DC bus by controlling an internal breaking transistor in the voltage regulator.

* * * * *